United States Patent [19]

Andersen et al.

[11] 4,357,572
[45] Nov. 2, 1982

[54] CURRENT FLARE OUT LIMIT CONTROL FOR PWM CONVERTER

[75] Inventors: Brad E. Andersen, Dover; Billy H. Hamilton, Summit; Robert E. Schroeder, Flanders, all of N.J.

[73] Assignee: Bell Telephone Laboratories, Incorporated, Murray Hill, N.J.

[21] Appl. No.: 247,899

[22] Filed: Mar. 26, 1981

[51] Int. Cl.³ .............................................. G05F 1/46
[52] U.S. Cl. .................................... 323/286; 323/284
[58] Field of Search ............... 323/282, 283, 284, 285, 323/286, 287; 361/18, 87, 93, 111; 363/18-21, 55, 56

[56] References Cited

U.S. PATENT DOCUMENTS

| | | | |
|---|---|---|---|
| 3,226,630 | 12/1965 | Lampke | 323/282 |
| 3,303,414 | 2/1967 | Jensen | 323/9 |
| 3,350,628 | 10/1967 | Gallaher et al. | 323/285 |
| 3,621,372 | 11/1971 | Paine et al. | 323/287 |
| 3,805,142 | 4/1974 | Rando | 321/11 |
| 4,148,097 | 4/1979 | Deisch | 363/26 |

Primary Examiner—William M. Shoop
Assistant Examiner—Peter S. Wong
Attorney, Agent, or Firm—A. G. Steinmetz

[57] ABSTRACT

A pulse-width modulated current regulator (FIG. 4) includes a current flare out control (406,407,409,412) to limit current output at low output voltages. Current variation in an output filter inductor (408) is monitored and compared with a reference standard (407). A conduction interval is controlled in response to the comparison in order to limit current flare out.

10 Claims, 7 Drawing Figures

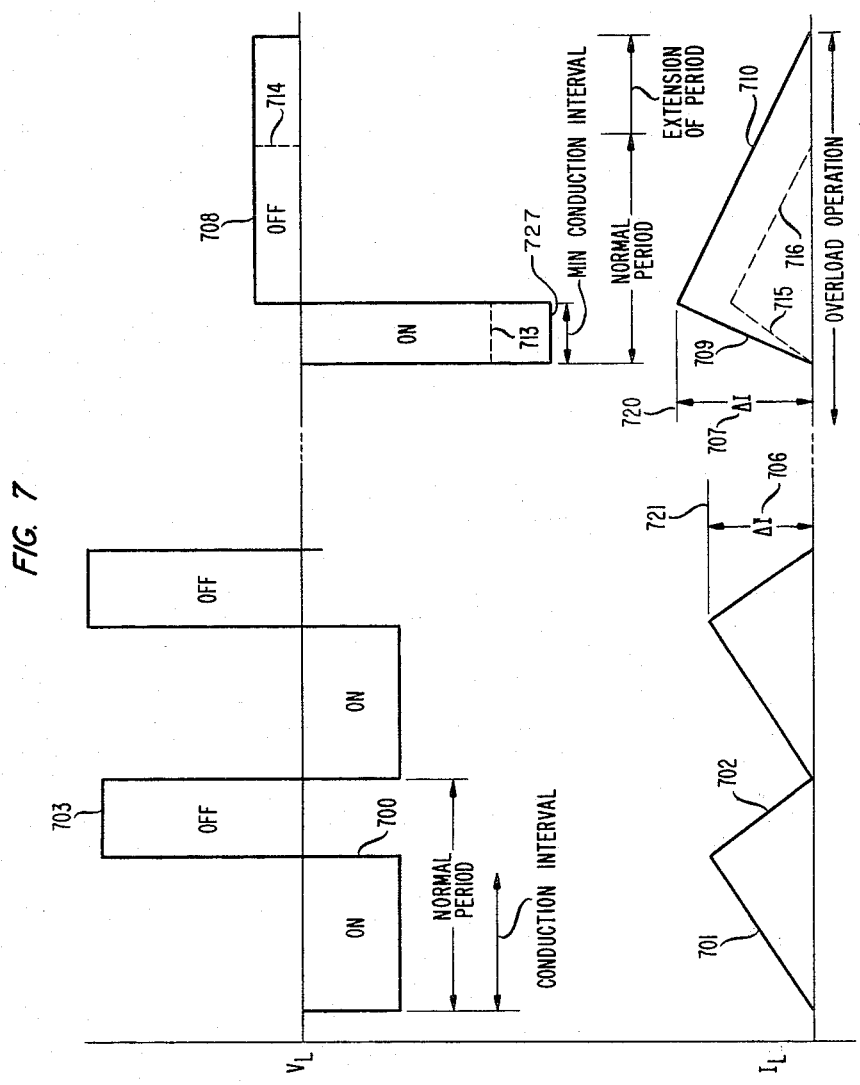

CURRENT FLARE OUT LIMIT CONTROL FOR PWM CONVERTER

BACKGROUND OF THE INVENTION

1. Field of the Invention

This invention is concerned with a current limit control for a pulse-width modulated regulator circuit or a DC-to-DC converter.

Pulse-width modulated converters, especially those using peak current control (PCC) techniques for regulation, experience a condition designated herein as "flare out" at low voltages during current limit overload modes of operation. During flare out, the output current of the converter exceeds its normal controlled upper limit value. Flare out is due to the filtering properties of the PCC current sensing circuitry and to the fixed turn-off delay characteristics of the switching transistors of the converter circuit. Excess current, due to a flare out condition, causes overcurrent stress in the switching transistor. However, while average output current exceeds the limit value, conduction intervals of the switching transistor are too short to allow turn-off loss reduction networks, that may be applied to the switching devices in the converter, to properly reset.

2. Description of the Prior Art

A typical prior art approach in dealing with excess current in an overload mode of operation is the introduction of a foldback characteristic into the current limit function. A typical foldback arrangement for a converter circuit is disclosed in U.S. Pat. No. 3,303,414 issued Feb. 7, 1967 to J. L. Jensen. The output voltage and output current of a converter circuit are simultaneously monitored. At the occurrence of an overload condition, the output current is significantly reduced as the output voltage drops. Hence, the inverter may operate indefinitely under a short circuit or overload condition without causing damage to the current carrying components of the inverter circuit.

Foldback current characteristics are not suitable for high current converter plant applications where extra current is needed to operate a load protection device and quickly isolate a fault without lowering bus voltage. Furthermore, where several high current converters are to be connected in parallel with one another, a foldback protection arrangement lowers the output current too drastically and permits parallel circuits to run indefinitely without operating protection devices.

SUMMARY OF THE INVENTION

Flare out during an overload condition is eliminated in accord with the principles of the present invention by precisely controlling the output current limit characteristics of a converter at low output voltages to operate at the predetermined normally desired current regulation limit. This result is accomplished by controlling the duration of the conducting interval of the switching device at low voltages during overload, by lowering the switching frequency of the switching device. In this mode of operation, the conduction interval becomes approximately constant and maintains the output current limit characteristic at low voltages at the desired normal constant current value, without introducing any foldback characteristic. This limits overcurrent stress on the switching transistors, allows any turn-off loss reduction networks used in the converter to properly reset, and also provides sufficient output current to operate protective devices.

In a particular converter regulation embodiment incorporating the principles of the invention, the switching frequency is lowered in response to control circuitry using integration and comparison techniques to lengthen the off-time of the switching transistors in the converter to equal an interval value determined by the control technique as the output voltage drops during an overload condition. This control action maintains a predetermined minimum AC current variation or differential of the output filter inductor to limit the output current to a definite threshold value and prevent a flare out condition.

The controlling signal for the current flare out protection circuitry is derived by comparing a voltage corresponding to the output filter inductor current during nonconducting intervals with a peak voltage of this filter inductor sampled during conduction intervals to maintain a predetermined minimum on time for the switching transistors.

BRIEF DESCRIPTION OF THE DRAWING

FIG. 7 contains voltage and current waveforms illustrative of the operation of the converter circuit disclosed in FIG. 6.

DETAILED DESCRIPTION

Figure 1:
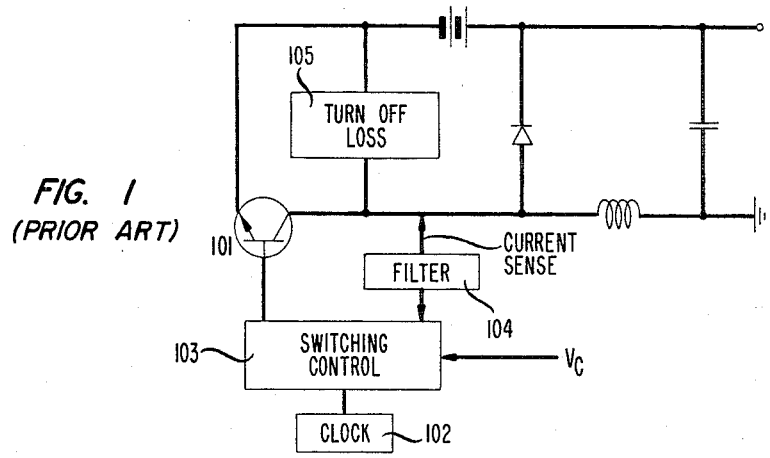
FIG. 1 is a combined block diagram and schematic of a typical peak current controlled converter circuit of the prior art.
Figure 3:
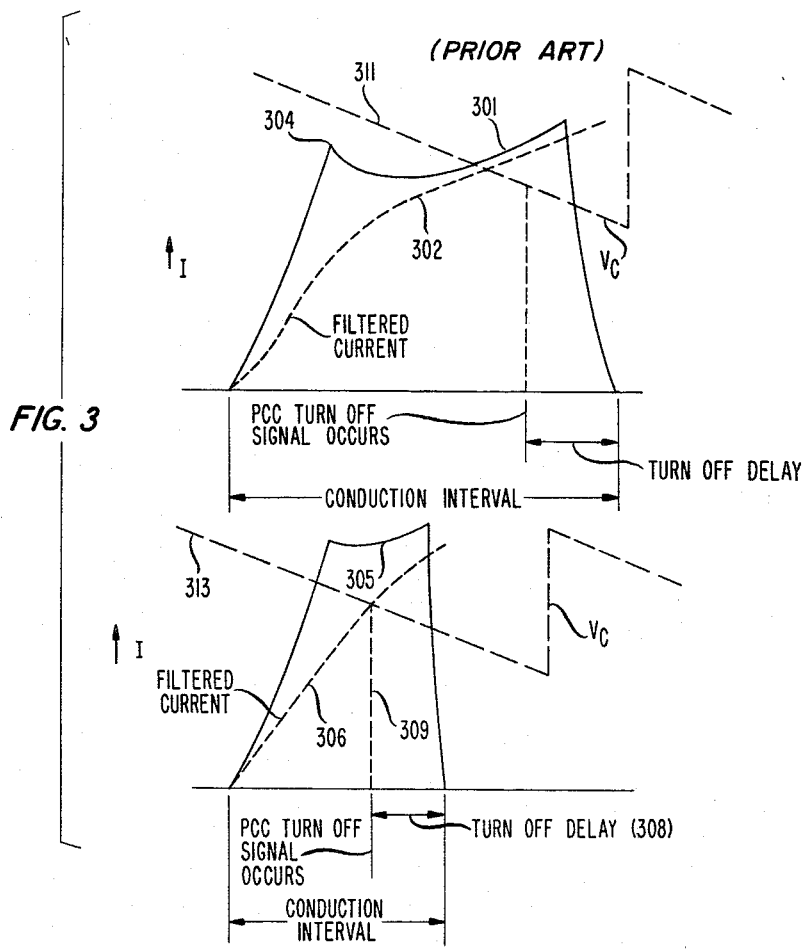
FIG. 3 discloses voltage waveforms of the current flow in the switching device in the converter circuit of FIG. 1 during normal load conditions and overload conditions.

Peak current control is a converter regulation technique, in which an output current representative of instantaneous current flow through the switching transistor is monitored and utilized on an instantaneous basis to regulate a voltage or current output of the converter. A converter circuit or switching regulator utilizing a typical peak current control arrangement is shown in FIG. 1. Switching transistor 101 is periodically turned on at a fixed frequency in response to a clock circuit 102, and the switching control circuit 103. When switching transistor 101 is initially turned on, the current therethrough has an initial peak transient after which the current increases linearly from some nominative value until conduction terminates. Voltage waveform 301 in FIG. 3 is proportional to current flow through the switching transistor 101 under normal operating conditions. Collector current of transistor 101 is sensed and coupled through a low pass filter 104 to switching control circuit 103. Filter 104 prevents the switching control 103 from responding to the initial transient spike 304 in the current waveform 301 and causes it to respond to the waveform 302 which is a filtered version of the current waveform signal. When the filtered current level exceeds a particular control voltage value $V_C$ shown by ramp voltage waveform 311, the switching control 103 operates to bias the switching transistor 101 nonconducting. This control voltage 311 is established by summation of a ramp voltage waveform, a reference voltage and an error voltage responsive to the output voltage. Specific circuitry to accomplish this is discussed subsequently herein with reference to FIG. 6. The ramp functions are used in applications where stability of operation is a major consideration. The actual nonconducting interval begins after a time delay, dependent on switching transistor 101 turn-off characteristics, following application of this turn-off signal.

Peak current flowing through the switching transistor 101 is regulated in accord with the value of control voltage $V_C$. With this method of control, the converter circuit may operate in a constant current mode, in which case the control voltage waveform $V_C$ is preset or it may operate in a voltage regulation mode, wherein the output voltage is compared to a desired value and an error signal is generated therefrom and utilized to generate a varying level of the control voltage waveform shown in FIG. 3 as a ramp waveform $V_C$ so that the output voltage is regulated through peak current control. Normally $V_C$ is varied to voltage regulate the converter circuit up to a threshold at which point, it is fixed and the converter circuit is thenceforth current regulated. A peak current controlled voltage regulated converter is disclosed in U.S. Pat. No. 4,148,097 issued Apr. 3, 1979 to Cecil W. Deisch and assigned to the same assignee as this application. That disclosure is incorporated herein for disclosing details of peak current control. Accordingly, it is not believed necessary to disclose a peak current control arrangement in further detail.

Should the output of the circuit of FIG. 1 experience a current overload or short circuit condition, the peak current control attempts to limit the output current by radically shortening the conduction time of the switching transistor 101. A typical voltage waveform 305 of this short conduction interval current is shown in FIG. 3. This results in the current flare out condition, as shown in the current voltage regulation characteristic shown in FIG. 2. Current flare out occurs at low output voltages below 50 percent of the regulated output voltage. This flare out condition is due in part to the action of the filter circuit 104 connected between the current sensor and the switching control 103 and to a fixed turn-off delay 308, which is an inherent characteristic in high power transistors.

The filtered current waveform 306 occurring during such an overload or short circuit condition has a very short interval before the turn-off signal is generated. As can be seen, however, the actual current output duration due to the fixed turn-off delay exceeds the interval determined by the intersection of the filtered current value shown by the dotted waveform line 306 and the turn-off control voltage 313 $V_C$ at time line 309. The time at which the switch control circuit removes drive from the switching transistor 101 is in advance of the actual termination of conduction. Furthermore, the peak value of the filtered current waveform 306 is considerably less than the unfiltered actual peak current value of waveform 305 flowing through the transistor. This difference plus the excess current flow through the switching transistor due to the fixed turn-off delay may be sufficient to cause damage resulting in the ultimate failure of the transistor.

It is apparent to those skilled in the art that the short conduction intervals of the switching transistor 101 during a short circuit or overload condition result in imprecise control of the peak current since the filtered waveform 306 on which control is based is significantly different than the actual current waveform 305. This plus extra current due to the fixed turn-off delay 308 produces the current flare out condition described above. Furthermore, as the conduction time becomes shorter and shorter, circuits requiring current flow for reset such as turn-off loss reduction circuit 105 are not permitted to reset properly before a subsequent conduction cycle. Turn-off loss reduction networks are well-known in the art, one such circuit is disclosed in U.S. Pat. No. 3,786,495, issued to E. T. Calkin et al. and hence, a detailed disclosure of the operation of such a circuit herein is not believed necessary.

In accordance with the principles of the invention, current flare out during an overload or short circuit is eliminated by including control circuitry in the overall switching device drive control to indirectly limit the minimum conduction time of the switching transistor to some predetermined minimum interval. In a particular embodiment of the invention applied to a peak current controlled converter shown herein, this minimum conduction time interval is achieved by lengthening the nonconducting interval of the switching transistor under an overload condition where the output voltage is abnormally low. Accordingly, as the output voltage drops under an overload condition, a smooth transition in control operation occurs moving from a constant frequency operation to a variable frequency operation of the converter. In this mode of operation, the conduction time of the switching transistor becomes approximately constant even at very low output voltages including a short circuit condition.

Figure 4:
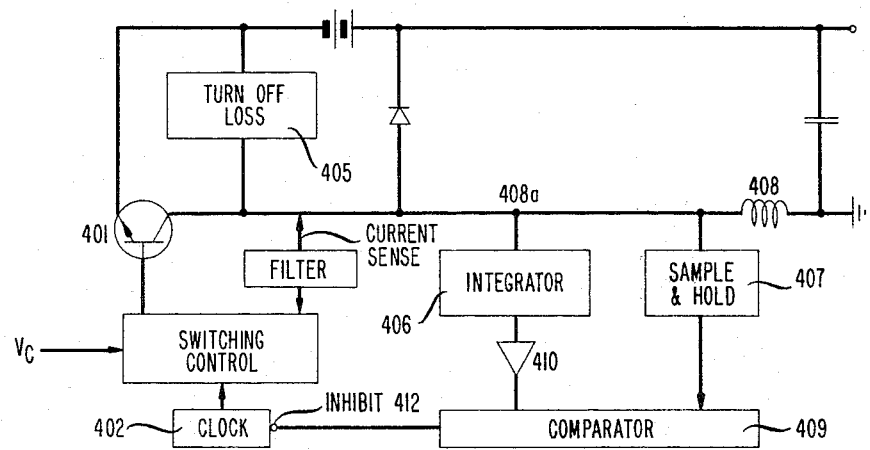
FIG. 4 is a combined block diagram and schematic of a peak current controlled converter circuit with flare out control circuitry operative according to the principles of the invention.

A switching regulator, shown in FIG. 4, discloses a converter that includes flare out control circuitry embodying the principles of the invention which operates to supersede the peak current control and independently control the off-time of the switching transistor 401 at low voltages during an overload condition. An integrator circuit 406, a peak signal sampling circuit 407, a comparator circuit 409 and a clock inhibit 412 comprise this control circuitry. This control circuitry is used to establish a minimum off-time threshold between output current pulses transmitted by the switching transistor 401 during an overload condition. A current differential or a current decrease threshold proportional to the voltage occurring across the inductor 408 during the off-time is measured by the control circuitry and used to lower the frequency of clock 402 by temporarily inhibiting it in order to establish this minimum off-time.

Integrator circuit 406 and the peak signal sampling circuit 407 are coupled to one terminal 408a of the filter inductor 408. Integrator 406 is designed to integrate an input signal up to a certain value and includes clamping circuitry to insure consistent integration values. Sampling circuit 407 is designed to detect and hold a peak voltage value. It compensates for converter input voltage changes. Integrator 406 is coupled to a comparator 409 via a polarity inversion circuit 410. Output signals of the polarity inversion circuit 410 and sampling circuit 407 are coupled to a comparator circuit 409. Comparator circuit 409 responds to these inputs and generates a high signal state output when and if the inverted integrated voltage exceeds the peak detected voltage. Comparator circuit 409's output is applied to an inhibit input 412 of clock 402 which operates to inhibit the clock action therein in response to a high signal state.

The peak voltage of inductor 408 is detected by sampling circuit 407 during the conduction interval of the switching transistor 401. This voltage is stored and applied to comparator 409. Integrator 406 integrates the voltage of inductor 408 during the nonconducting interval of switching transistor 401 while the output current is decaying. The continuously changing integrated value of the inductor voltage during this decay is inverted by polarity inverter 410 and compared by comparator 409 with the sampled peak of the inductor voltage established during the conduction interval. When the inverted integrated voltage value equals the sampled threshold voltage value, comparator 409 which has been applying a signal to an inhibit input 412 of clock 402 removes that signal permitting the clock 402 to resume operation. This indicates that the desired minimum off-time has been achieved.

Figure 5:
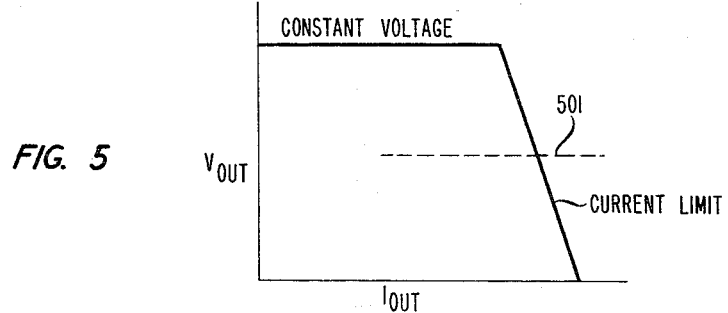
FIG. 5 is a graph of the voltage and current regulation characteristic of the converter circuit of FIG. 4.

This control action of integrator circuit 406 and sample circuit 407 forces an automatic change in the control mode from a constant frequency operation of the standard peak current control system to a variable frequency system or current differential system as the converter output voltage decreases with an increasing overload condition. The voltage current regulation characteristic attained by this arrangement is shown in FIG. 5. The overload regulation control circuitry described above to prevent flare out takes effect as the voltage drops below half its normal regulated value as designated by voltage level 501, thereby eliminating the flare out condition shown in FIG. 2 occurring in the prior art regulator circuit shown in FIG. 1. In the differential current control mode disclosed herein, the converter operates in a variable frequency mode in which the operating frequency is decreased by increasing the nonconducting interval of the transistor 401. This nonconducting interval is approximately inversely proportional to the output voltage. The conducting interval of transistor 401 is maintained constant instead of decreasing to a very small value as is the case with conventional control systems as the output voltage tends toward zero. This eliminates the current flare out condition and also advantageously provides at the same time sufficient current flow to allow any turn-off loss reduction networks 405 used in the converter to be properly reset.

Figure 6:
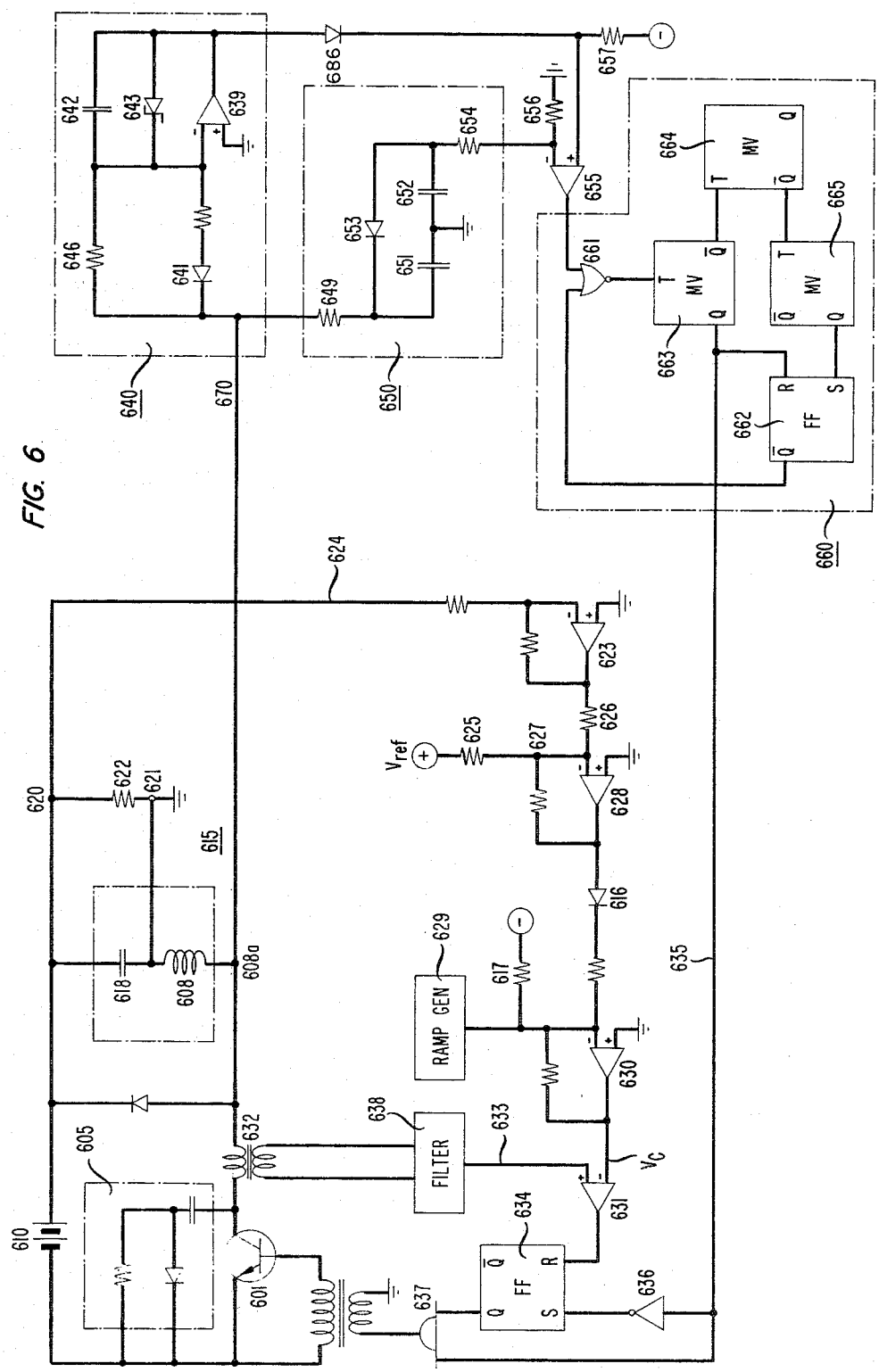
FIG. 6 is a detailed combined block diagram and schematic of a peak current controlled converter including flare out control circuitry according to the principles of the invention.

A converter embodied as a buck-type switching regulator utilizing peak current control and including a specific embodiment of a control circuit operative to prevent the occurrence of a flare out condition is disclosed in schematic and block form in FIG. 6. A DC voltage supplied by a battery 610 is coupled by a switching transistor 601 via an output filter 615 to a load 622. Switching transistor 601 has a high voltage capacity and is switched at a relatively high frequency preferably exceeding 5 kHz. LC filter 615 comprises an inductor 608 and a capacitor 618 which in turn is coupled to output terminals 620,621 which are connected to a load 622.

The output load signal at terminals 620,621 is voltage regulated in the example herein by peak current control techniques. Sensing circuitry including an inverting amplifier 623 and a sensing lead 624 monitors the output voltage at terminal 620. This sensing of the output voltage is utilized in order to generate an error voltage with which a ramp signal from ramp generator 629 and a reference voltage is combined to generate a ramp control voltage $V_C$ with which a voltage representing a sensed peak collector current of the switching transistor 601 is compared.

The sensed output voltage at terminal 620 is coupled, via lead 624, to a first inverting amplifier 623 with controlled gain to convert it to a usable signal level, whose output, in turn, is coupled to one end of a level shifting amplifier 628 via resistor 626. Resistor 625 is coupled to a positive reference voltage $V_{ref}$, which cancels the DC voltage level of the signal supplied from amplifier 623. Amplifier 628 generates an error voltage appearing at the cathode of diode 616 corresponding to the difference between the output voltage at terminal 620 and the desired regulated voltage value. This error voltage is modified by having a ramp voltage generated by ramp generator 629, and a negative reference voltage applied via resistor 617 summed with it to achieve control voltage $V_C$ shown by waveform 311. The ramp waveform of the control voltage makes the time of switching more precise by increasing the angle between the control voltage and the sensed collector current ramp voltage waveform of transistor 601. This ramp function is utilized to solve certain feedback stability problems which may occur at a large duty cycle. This error voltage with the superimposed reference voltage and ramp waveform is applied, via summing amplifier 630, to a comparator 631 where it becomes the ramp waveform control voltage $V_C$ 311. During overload condition, the ramp waveform control voltage is as shown by waveform 313 in FIG. 3. This control voltage waveform $V_C$ has a negative ramp slope as shown in FIG. 3. If the output voltage of amplifier 628 drops below ground level, diode 616 is back biased. In this condition, the output of amplifier 630 is independent of the error voltage and the converter operates in a constant current limiting mode.

A current sensing transformer 632 monitors the instantaneous collector current of transistor 601. A voltage waveform representing this current is applied, via filter 638 and lead 633, to comparator 631. When this filtered version of the sensed current waveform amplitude as shown by waveform 302 in FIG. 3 exceeds the control voltage $V_C$ shown by ramp waveform 311, comparator 631 applies a signal to reset flip-flop 634, which controls the switching of transistor 601.

Flip-flop 634 is periodically set by the pulse output of clock 660 applied to it via lead 635 and polarity inverter 636. This pulse is also applied to and enables the AND gate 637 to apply the set signal output of flip-flop 634 to periodically bias the switching transistor 601 conducting. When the filtered waveform version of the sensed collector current exceeds the reference level set by ramp waveform 311, comparator 631 changes its output state and resets flip-flop 634 thereby changing its output state to a low value disabling AND gate 637 and removing the drive signal from transistor 601. The level of control voltage 311 varies as the output voltage deviates from its desired value and at a prefixed limit becomes a fixed value due to back biasing of diode 616 as discussed above thereby causing the regulator to operate in a constant current mode.

The voltage waveform, of the collector current of transistor 601 is filtered by a filter 638 so that initial spike transients in the current waveform do not falsely trigger the comparator 631 by accidentally exceeding the ramp control voltage 311. Consequently as discussed above, the controlling waveform at short conduction intervals differs considerably from the true waveform thereby contributing to a flare out condition. This flare out condition is counteracted according to the invention herein by limiting the minimum conduction intervals at low output voltages during an overload condition. When switching transistor 601 is conducting, output current flows in the inductor 608 and produces a negative voltage level 700 across the inductor 608 producing a current waveform therein in the form of an increasing ramp waveform 701, as shown in FIG. 7. When the transistor 601 stops conducting, the voltage across inductor 608 goes positive to voltage level 703 and the current in the inductor becomes a decreasing ramp waveform 702. The duration and amplitude of these increasing and decreasing ramps is dependent upon the conduction interval of the switching transistor 601, its switching frequency and the voltages present. As the conduction interval of switching transistor 601 becomes shorter due to an overload, the amplitude difference indicated by $\Delta I$ 706 in FIG. 7 between the peak and bottom of the current ramp waveform in conventional converters changes in value. In conventional converters, this differential in current amplitude $\Delta I$ becomes very small during the very short conduction intervals of the switching transistor caused by overload conditions. As a result, disadvantageous operating conditions occur such as, (i) the switching transistor with its fixed turn-off delay continues to conduct for some time after the turn-off signal is applied allowing the converters regulator to lose control over output current flow and (ii) the conduction interval is so short that should turn-off loss reduction networks such as network 605 be used in the converter, they do not have time to reset.

Figure 2:
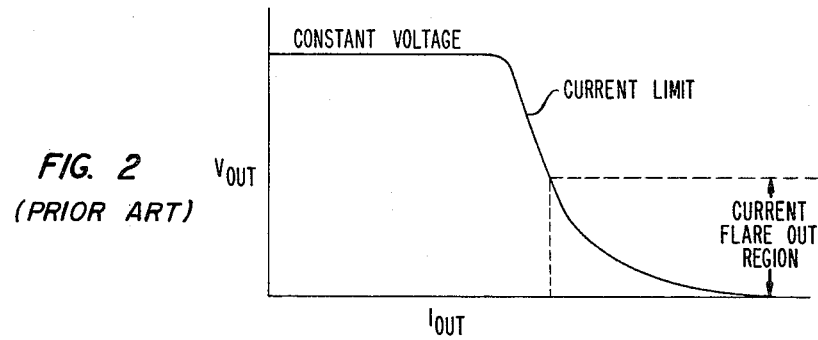
FIG. 2 is a graph of the voltage and current regulation characteristic of the converter circuit of FIG. 1.

Therefore, the regulation circuitry includes circuitry to control the minimum conduction interval of the switching transistor and hence, control the differential amplitude $\Delta I$ 707 of the current levels in the output inductor 608 to establish some predefined threshold differential current amplitude value in order to avoid the current flare out condition of the current voltage regulation curve shown in FIG. 2 and to allow turn-off loss reduction networks to properly reset.

This controlled $\Delta I$ may equal, exceed, or be less than the normal $\Delta I$ value. It is shown in FIG. 7 as slightly exceeding the normal $\Delta I$, however, during the overload condition, it represents a controlled value of $\Delta I$. It is noted as shown in FIG. 7 that during an overload, the switching period is extended so that it exceeds the normal switching period and the conduction interval of the switching transistor is constrained to be some predetermined minimum value. The inductor voltage 727 is greater during conduction and voltage 708 is less during nonconduction than during normal operation. Accordingly, the slope of rising current 709 is greater than the aforementioned slope 701 during normal operation.

To achieve this control objective of preventing a flare out condition, the cyclic current differential in the output inductor 608 is continuously and indirectly monitored. A voltage corresponding to this current is sensed at the node 608a of the inductor 608. This sensed voltage is coupled, via lead 670, to a voltage integrator circuit 640 and to a peak voltage detector 650. The outputs of both of these circuits are applied to a comparator 655, whose output operates to inhibit a clock 660 during the switching transistor's nonconducting intervals, in order to increase the off-time of switching transistor 601 during overload conditions. Clock 660 normally drives the transistor switch 601 at a fixed frequency. During overload this frequency is reduced and as shown in FIG. 7, the switching period is extended.

Integrator 640 is connected to integrate the voltage waveform of inductor 608 during the interval of decaying current due to nonconducting intervals of transistor switch 601. This is represented by a positive voltage at the inductor node 608a as shown by waveform 703 in FIG. 7. Peak detector 650 senses and stores a negative peak voltage, shown by waveform 700 in FIG. 7, occurring across inductor 608 during a conducting interval of transistor switch 601. Comparator 655 is coupled to respond to these signals and to control switching action and frequency of clock 660.

The input to integrator circuit 640 includes a resistor 646 which couples the positive voltage to be integrated to the inverting input of operational amplifier 639. A steering diode 641 also couples node 608a to the inverting input of an operational amplifier 639. Voltage at node 608a is negative when transistor 601 is conducting. Steering diode 641's polarity ensures that the negative inductor voltage is applied to the integrating op amp, only to reset the integrating circuit during the conducting interval of transistor 601. It is apparent from the foregoing that during the decreasing current ramp waveform the inductor voltage is integrated and the integrating circuit is reset during the increasing current waveform.

The feedback circuitry of op amp 639 includes circuitry to limit the charge on the integrating capacitor 642 and control the initial output at which each charging begins. Shunted across this capacitor is a zener diode 643, which is used as a nonlinear feedback element to limit the ultimate output voltage level of the integrator circuit, avoid the saturation of the integrator and control the initial charging voltage. Integrator 640 integrates the positive inductor voltage until the voltage on capacitor 642 equals the breakdown voltage of zener diode 643. This ensures that the ultimate integrated voltage may not exceed a threshold value that occurs during normal voltage regulation operation of the voltage regulator. The integrator is periodically reset during the negative voltage phase of inductor 608 through the enabled discharge path including diode 641 to a limit determined by the forward drop of zener diode 643.

The peak voltage detector 650 includes a rectifying diode 653, an input filter capacitor 651, an associated resistor 649, and a peak voltage detecting capacitor 652. Due to the polarity of diode 653, charge is stored on capacitor 652, when the voltage across inductor 608 drops negatively below the zero level during the conduction interval. Capacitor 652 follows the negative voltage of inductor 608 and stores the peak voltage value occurring. This value is maintained sufficiently long to accomplish the desired control function. Resistors 654 and 656 function to scale this voltage value to a proper level.

Since the voltage on capacitor 652 is a function of the DC input voltage, the peak current detector compensates for changes in input voltage. This is shown by dotted current waveform 715 and 716 in FIG. 7 compared with current waveform 709 and 710. Waveform 709 and 710 show current in inductor 608 with normal input voltage. With reduced input voltage under an overload the $\Delta I$ is reduced and current ramp waveform 715 charges to a lesser magnitude. It is noted that the minimum conduction time remains the same, however, he negative voltage across inductor 608 is reduced as shown by dotted line 713. Regardless of the ΔI magnitude the decaying current waveform slope remains the same as shown by current decay ramp waveforms 716 and 710. This uniform slope characteristic alters the off-time and for ramp waveform 716 the off-time terminates at dotted line 714. The outputs of the sampled voltage in peak detector 650 and the output voltage of integrator 640 are applied in parallel to comparator 655. The integrated output is coupled via a diode 686 to the noninverting input of comparator 655. The voltage drop across diode 686 compensates for the offset caused by the voltage drop across zener diode 643 in the feedback path of op amp 639. The junction of diode 686 and the noninverting input of comparator 655 is coupled through resistor 657 to a pull-down voltage source. The peak detector, which charges up each cycle to provide a peak voltage level on capacitor 652, is coupled to the inverting input of comparator 655 via resistor 654. Comparator 655 responds to these two inputs and generates a high output state whenever the integrated voltage exceeds the peak detected voltage and a low output state when the integrated voltage is less than the peak voltage.

The output of comparator circuit 655 is applied to a NOR gate 661 included in clock 660. Specifically, the clock comprises a plurality of logic timing circuits connected in a cross coupled feedback arrangement to generate clock pulses. Normally clock 660 is free running thereby generating a series of output clock pulses, which are applied, via lead 635, to the drive control of switching transistor 601 to initiate periodic conduction therein.

As described above, the peak current control arrangement terminates the conduction. However, the output of the comparator 655 determines whether the clock shall be free running or whether its off-time duration is to be increased to prevent flare out. During normal operation of the circuit when no short circuit or overload has occurred, the output of the comparator is a low logic state before the next on-time of the clock occurs. This permits the clock circuit to run freely.

When the integrated voltage exceeds the peak detected voltage, the output of comparator 655 goes high applying an inhibit signal to clock 660.

Clock 660 comprises the monostable circuits 663,664,665, the flip-flop 662 and a NOR gate 661. Monostable circuit 663 is timed to produce a relatively long pulse to control the on-time of the clock. Monostable circuit 664 is timed to produce a short duration pulse to control the off-time of the clock, and monostable circuit 665 is timed to produce a short trigger pulse.

Comparator 655 applies a high level signal to NOR gate 661 to increase the duration of the off-time of clock 660. The effect may be explained by describing the operation of clock 660. Assume initially that monostable circuit 663 is on with its output Q at a high level state. Comparator 655 applies a high level signal to NOR gate 661, disabling that gate from responding to an output of flip-flop 662. Under normal operating conditions, the gate will be enabled before the operation of the clock is inhibited. With an overload condition the enabling of NOR gate 661 is delayed sufficiently to increase the normal free running off-time of clock 660.

At the end of the timing period of monostable circuit 663, the $\bar{Q}$ output goes high and triggers monostable circuit 664. At the end of its timing interval, the $\bar{Q}$ output of monostable circuit 664 triggers monostable circuit 665 whose Q output, in turn, sets flip-flop 662. The $\bar{Q}$ output of flip-flop 662 goes low. If the output of comparator 655 is low, NOR gate 661 applies a high level signal to trigger monostable circuit 663 and the clock cycle repeats. The clock signal to periodically reset flip-flop 634 is taken from the Q output of monostable circuit 663 applied to it by inverter 636.

If the output of comparator 655 is a high state as occurs during overload, the NOR gate 661 maintains a low state output and does not trigger monostable circuit 663 until the comparator output goes low, at which point, clock 660 resumes its normal oscillatory action.

During the on-time of the switching transistor, the sampling circuit 650 establishes a peak voltage on capacitor 652, which sets a reference voltage which is a function of the input and output voltages. During this on-time, diode 641 is forward biased conducting and allows the integrator capacitor 642 to discharge, allowing the integrator circuit to be reset to approximately zero. When the switching transistor 601 is biased nonconducting, the voltage across inductor 608 approximately equals the output voltage. The integrator responds and begins integrating this voltage, and its output signal begins to decrease in magnitude. The output value of the integrator keeps decreasing until it exceeds the reference value amplitude established by peak detecting circuit 650 during which clock 660 is inhibited to prevent flare out. As shown in FIG. 6, the terminal 608a of inductor 608 is coupled to integrating capacitor 642 through either resistor 646 or through a path including diode 641 and another resistor. This is to provide the integrator with different time constants in responding to positive and negative voltages at terminal 608a. The path through diode 641 has a short time constant relative to the path through resistor 646. The time constant during off-time is selected so that during normal nonoverload operation of the converter the resultant output of comparator 655 has no effect on the frequency of operation of the clock 660, which is left to run freely at its natural frequency. During normal operation, the output of the integrator 640 does achieve the value of the peak detector voltage before the beginning of the next clock pulse (i.e., on-time of the clock). However, during an overload or short circuit condition, the output of the integrator 640 again equals the reference voltage established by the peak detector, however this event occurs beyond the normal off-time of the clock thereby extending it beyond its normal time interval. When this condition occurs, the output of the comparator switches from its high level state to a low level state allowing the clock to resume its normal operation following an increased off-time of the clock. This high level signal state is applied to the NOR gate 661 of clock 660 to inhibit its clocking action.

The effect of this flare out prevention operation may be observed from the voltage and current waveforms shown in FIG. 7. During normal operation, the current ramps 702 and 701 responsive to positive and negative inductor voltages 703 and 700 produce a current differential ΔI 706. During overload conditions the positive inductor voltage is reduced; however, due to the flare out control the current differential ΔI 707 is maintained at a threshold value 720 determined by the input and output voltages and the conduction time of the switching transistor. This threshold value 720 may be greater or less than the normal ΔI threshold value 721. The magnitude of ΔI during overload conditions is determined by operational constraints of the circuit requiring that the volt-second area of the inductor voltage waveform be equal for both conduction and nonconduction intervals. Since a minimum on-time is fixed, the ΔI will vary somewhat with differing input and output voltages of the regulator to maintain the volt-second requirement.

When the comparator switches to its low level state, the clock resumes its normal operation and switching transistor 601 is biased into conduction. Therefore, it can be seen from the foregoing description that whenever an overload condition occurs during which a flare out condition normally occurs, namely when the voltage output drops below 50 percent of its regulated value, the frequency of operation is changed by increasing the duration of the off-time between pulses applied to bias the switching transistor into a conducting condition.

While one specific embodiment has been shown to illustrate the principles of the invention, it is to be understood that many variations of this method may be used to eliminate the flare out condition without departing from the spirit and scope of the invention.

What is claimed is:

1. A switching regulator comprising in combination a peak current control type voltage and current regulation control including a clock to periodically initiate conduction in a power switching device and means for terminating conduction in response to attaining a current threshold in the power switching device and a current flare out control circuit operative during current regulation modes of operation at low output voltages during overload conditions, the current flare out control including
   a sensing connection to sense a voltage of an output filter inductor, an integrator coupled to the sensing connection and operative to continuously integrate the voltage of the filter inductor during nonconducting intervals of the power switching device, a peak detecting circuit coupled to the sensing connection and operative to acquire a peak voltage of the filter inductor during conducting intervals of the power switching device, and
   comparator means responsive to an equality of a voltage output of the peak detecting circuit and of the integrator, and inhibit circuitry to inhibit retriggering of the clock in response to the comparator means until equality is achieved in order to increase a periodic off time interval of the power switching device during overload conditions at low output voltages and reduce current flare out.

2. A switching regulator as defined in claim 1 wherein the integrator comprises an operational amplifier including a feedback capacitor and a breakdown diode shunting the capacitor to limit an upper and lower integrator value and including first and second charging paths to change a rate of charging of the feedback capacitor in response to a polarity of voltage of the output filter inductor to permit rapid resetting of the integrator.

3. A switching regulator as defined in claim 2 wherein the clock includes at least two monostable circuits wherein an output of each monostable circuit is connected to an input of another one of the monostable circuits, and the inhibit circuitry includes a gate responsive to the comparator output and connected between the two monostable circuits.

4. A switching regulator as defined in claim 3 wherein the peak detecting circuit includes a storage capacitor and a discharge path having a time constant long with respect to a timing interval that a peak voltage is used for comparison and an input filter capacitor.

5. A peak current controlled converter circuit comprising input means, output means including a filter inductor and power switching means coupling the input and output means, periodic switching control means operative for controlling an instantaneous peak current value in the power switching means, current limit means for limiting average current to a fixed current limit at the output means, and means for eliminating current flare out conditions at the fixed current limit during low output voltages comprising
   first means for integrating a voltage of said filter inductor during a nonconduction interval of the power switching means,
   second means for sampling a peak voltage of said filter inductor during a conduction interval of the power switching means,
   third means for comparing outputs of said first and second means and operative for extending an off state of said power switching means until an output of said first and second means reaches equality.

6. A peak current controlled converter as defined in claim 5 wherein said first means for integrating comprises an operational amplifier including an integrating capacitor and a breakdown diode shunting the capacitor to limit values of integration and a polarity responsive input means for assuring integration of the filter inductor voltage during a nonconduction interval and rapid resetting of the integration during conduction intervals.

7. A peak current controlled converter as defined in claim 5 wherein said second means for sampling a peak voltage comprises a storage capacitor and a discharge path having a time constant that is long with respect to a time interval that a peak voltage is used for comparison with an output of the means for integrating and an input filter capacitor.

8. A peak current controlled converter comprising;
   input means for accepting a voltage source,
   output means including a filter inductor for accepting a load to be energized,
   power switching means for controlling current flow from the input means to the output means,
   switch control means operative for periodically enabling the power switch means and immediately disabling it when a predetermined current threshold within the power switch means is reached; and
   current control means for limiting current flare out and operative during current limited low output voltage overload conditions, comprising;
   integration means for determining an integrated value of current flow through the filter inductor during a conduction interval of the power switching means,
   sampling means for determining a peak current value of current flow through the filter inductor during a nonconduction interval of the power switching means,
   comparator means for comparing magnitudes of said integrated value of current flow and said peak current value of current flow and providing an output signal change when said magnitudes are equal, and
   inhibit means for extending an interval of nonconduction of the power switch means by the switch control means in response to an output signal of said comparator means.

9. A peak current controlled converter as defined in claim 8 wherein said integration means comprises polarity responsive input means for assuring operation during a nonconduction interval of the power switching means and integration limit means so that the integration means is not operative to extend a nonconduction interval of the power switching means at normal regulated output voltage conditions of the converter.

10. A peak current controlled converter as defined in claim 8 wherein the means for sampling comprises a storage capacitor and means for discharging the storage capacitor with a long discharge time interval with respect to a time interval that a peak voltage is used for comparison with an output of the means for integrating.

* * * * *